United States Patent [19]

McLaughlin et al.

[11] 4,035,163

[45] July 12, 1977

[54] CONDITIONING CLEANSER FOR CERAMIC SURFACES

[75] Inventors: Robert L. McLaughlin, Wilmette; Donald C. Wood, Des Plaines; Wesley A. Kraszewski, Chicago, all of Ill.

[73] Assignee: DeSoto, Inc., Des Plaines, Ill.

[21] Appl. No.: 540,580

[22] Filed: Jan. 13, 1975

[51] Int. Cl.² .......... C09K 3/14

[52] U.S. Cl. .......... 51/303; 51/306; 51/307; 51/308; 106/5; 106/11

[58] Field of Search .......... 51/302–308; 106/5, 11

[56] References Cited

U.S. PATENT DOCUMENTS

| | | | |
|---|---|---|---|
| 2,006,162 | 6/1935 | Fuchs | 51/304 |
| 2,154,721 | 4/1939 | Blount et al. | 51/304 |
| 2,295,132 | 9/1942 | Sharp | 51/305 |
| 2,296,690 | 9/1942 | Soderberg | 51/304 |
| 2,586,211 | 2/1952 | Currie | 51/302 |
| 2,765,223 | 10/1956 | Candee et al. | 51/304 |
| 2,881,065 | 4/1959 | Reuter | 51/305 |
| 3,607,161 | 9/1971 | Monick | 51/294 |
| 3,619,962 | 11/1971 | Combe | 51/304 |

*Primary Examiner*—Donald J. Arnold
*Attorney, Agent, or Firm*—Dressler, Goldsmith, Clement, Gordon & Shore, Ltd.

[57] ABSTRACT

An alkaline cleaning and conditioning composition for ceramic surfaces is provided in the form of an abrasive powder mixture including a surfactant, and a silicone oil absorbed in a water soluble absorbent powder.

18 Claims, No Drawings

CONDITIONING CLEANSER FOR CERAMIC SURFACES

The present invention relates to the cleaning and conditioning of ceramic range tops. The art has previously employed two separate compositions, one whose primary purpose is to clean the ceramic surface by removing burnt-on food, metal marks and hard water precipitates, and a second whose primary purpose is to condition the surface and render it nonadherent. Efforts to combine the two functions into a single liquid or paste-like composition have sacrificed some cleaning power and have encountered other difficulties, such as dispersing difficulties.

This invention is concerned with a powder composition adapted to clean and condition the ceramic range top surface in a single application.

In this invention, a silicone oil is absorbed in a water soluble absorbent powder and is incorporated, after such preassociation, into an abrasive powder mixture including a surfactant, which is preferably nonionic. Alkaline material, which preferably also functions as the water soluble absorbent, provides the composition with an alkaline pH in 1% water solution not in excess of pH 11, preferably not in excess of 10.0. A chelating agent for metals, such as iron, aluminum and copper, preferably a polycarboxylic chelating agent is also desirably present to remove metal marks. It is also desirable to have present a water soluble film former, which is preferably cellulosic, to modify the abrasive and prevent it from scratching the ceramic surface when the abrasive powder mixture is rubbed on the ceramic surface with a wet cloth, sponge, or paper towel.

The abrasive powder constitutes the bulk of the powder mixture, e.g., at least about 50%, and preferably from 70% to 90% of the weight of the mixture. The abrasive particles preferably have an average particle size of from 140 to 180 mesh on standard Taylor screens. A preferred abrasive mixture is constituted by alpha quartz (a quartz having a moh hardness not in excess of 7.5) modified by the presence of diatomaceous earth to minimize the scratching tendency. One part of diatomaceous earth is required to modify from 2 to 10 parts of quartz, preferably from 3 to 8 parts of quartz. A weight ratio of about 1:7.4 is most preferred. Less preferably, pumice or feldspar can replace the quartz.

The silicone oils which are used in this invention are well known. Generally, the silicone oils are liquid methyl-substituted polysiloxanes which differ, one from the other, by their viscosity, which increases as the molecular weight of the polysiloxane increases. The silicone oils which are utilized have a sufficient molecular weight to provide a viscosity of about 5 to about 500 centipoises, preferably from 10–100 centipoises. A viscosity of 50 centipoises is particularly preferred and will be used as illustrative. The silicone oil is used in an amount of from 1–5%, preferably from 1.5–3% of the weight of the powder composition.

In the composition of the invention, the silicone oil adheres to the ceramic surface in the aqueous medium provided when the powder mixture is applied with the aid of water to condition the surface and minimize the tenacious adherence of materials to the surface. This function for the silicone oil is itself well known, but when the oil is incorporated in an abrasive powder without preassociation with an absorbent water soluble powder as required herein, the silicone oil becomes associated with the abrasive particles, and it does not transfer efficiently to the ceramic surface where it is needed.

A surfactant is mixed with the abrasive powder, preferably a nonionic surfactant. The surfactant may be liquid or solid and serves the usual wetting and emulsifying functions of a surfactant. If the surfactant is solid, it is simply mixed into the powder composition. If it is liquid, then it is sprayed into the powder composition in order to distribute it uniformly throughout the powder. It will be understood that a free flowing powder for home consumption is intended, and this requires that the powder be as uniform in composition as can be conveniently provided. The surfactant is employed in an amount of from 0.1% to about 5.0% of the weight of the composition, though it is preferred to employ nonionic surfactants which are effective in an amount less than 1.0%, since this enables spotting to be avoided as a result of the low concentration of the surfactant. Nonionic surfactants are preferred because these provide the best cleaning power without inducing any spotting tendency.

The preferred nonionic surfactants which are effective in an amount less than 1.0% of the powder mixture are illustrated by ethoxylated straight chain primary alcohols such as $C_{12}-C_{14}$ alcohols adducted with ethylene oxide to provide from 50–70%, preferably about 60% by weight, of adducted ethylene oxide. The commercial surfactant Conoco Oil Co.'s Alfonic 1412-60 is an illustration of a suitable commercially available surfactant of this type. Ethylene oxide adducts of octyl or nonyl phenols and the like providing a similar hydrophobic-hydrophilic balance are also suitable. Indeed, all of the nonionic surfactants are useful herein. When the surfactant is of low effectiveness so as to require more than 1.0% thereof, then it is preferably selected to be volatile. A suitable commercial volatile surfactant is illustrated by Surfynol 104 which is an acetylenic glycol.

While anionic and cationic surfactants provide the desired cleaning power, they are generally less effective, more prone to spotting, and therefore less desired for use in this invention. The anionic surfactants are illustrated by sodium lauryl sulphate, and the cationic surfactants are illustrated by trimethyl phenyloctadecyl ammonium chloride.

It is important to this invention that a water soluble absorbent be preassociated with the silicone oil to release the same on the ceramic surface when water is applied. It is convenient to use a water soluble absorbent powder which is alkaline to provide a dual function, such as an alkali metal (sodium potassium or lithium) salt of a weak acid. Such alkaline salts are preferably illustrated by sodium carbonate. Synthetically prepared sodium carbonate (soda ash) is especially desirable since it possesses greater absorbency so that less is needed to absorb the silicone oil and this requires less buffering. It will be understood that reference to absorption is used generically and that adsorption is intended to be embraced since, in any given instance, one or the other, or both mechanisms may be involved. All that is required is that the silicone oil be carried by the water soluble absorbent with the remaining powder components of the powder mixture so as to become available when water is employed at the time of application to the ceramic surface.

It will be appreciated that the powder used to absorb the silicone oil need not be alkaline, nor need it have any particular alkalinity if it is alkaline. Borax can be used or sodium sulphate or bisulphite. When the absorbent is not alkaline, then some other material may be used to provide the desired alkalinity to the powder mixture when water is added. Thus, one would wish to use sodium carbonate powder to provide desired alkalinity even when some other material was selected to absorb the silicone oil and release it when water is supplied.

The silicone oil and the powder absorbent are simply mixed together for a sufficient length of time to permit the powder to pick up the oil and render at least a part thereof unavailable to the remaining powder components of the composition. This is because if the insoluble particles in the composition become associated with the silicone oil, then that oil remains associated with the powder during application, and does not transfer efficiently to the ceramic surface being cleaned.

It is desired to have the absorbent powder present in considerable excess over the silicone oil in order to fully absorb the same in order that it might be made available at the time of application when the absorbent dissolves. On this basis, there should be at least 2 parts of absorbent per part of oil, preferably at least 4 parts of absorbent per part of oil. The absorbent may constitute up to about 25% of the weight of the powder composition.

The alkaline agents used may be constituted by any water soluble alkaline material, preferably sodium carbonate, as noted above. A buffering compound, such as ammonium sulphate, is used to avoid excessive pH. Citric acid and sodium bisulphate will further illustrate appropriate buffering agents.

It will be understood that powder products applied by hand in the household are particularly contemplated, and hazardous substances should be avoided. Admixture should be sufficient to insure that each aliquot of powder dispensed will be of approximately of the same composition. Free moisture should be excluded, or drier materials added to absorb the same, since water causes deterioration of the composition and it also interferes with the desired free flowing characteristic.

The maximum alkalinity is established by safety. The more alkaline the system, the better the cleaning. Above pH 11, one encounters significant hazard. We prefer to stay below pH 10.0 where there is little hazard, and to be as close to pH 10.0 as possible to maximize cleaning without introducing any significant danger of skin irritation. A pH of at least about 8 is desirable to provide the desired alkaline cleaning environment when water is added.

The chelating agent, especially polycarboxylic chelating agents, such as ethylene tetraacetic acid or nitrilo triacetate, removes metal marks and hard water deposits, and thus helps the cleaning action. The chelating agents will generally constitute about 1–10% of the weight of the powder composition, and these may be introduced as such or in water solution.

The presence of a water soluble film forming material such as sodium carboxy methyl cellulose is preferred since this further minimizes the scratching tendency of the abrasive powder. The film former is used in an amount of from 0.1–3% of the weight of the powder composition, preferably from 0.2–1%.

The composition may also include a drier, such as anhydrous magnesium sulphate. The drier serves to absorb any water which may be introduced, as may be included in the chelating solution. This serves to dry the abrasive powder mixture and prevent premature ammonia release.

A typical formula for a powder abrasive mixture in accordance with this invention is as follows. It is made by spraying the silicone oil on the finely divided sodium carbonate powder as the carbonate is tumbling in a mixer. Mixing is continued until the powder is dry. The remaining powders are then added and the liquid components are sprayed in while the mixture is tumbling to obtain a relatively uniform distribution of all the components.

| Component | Percent by Weight |
|---|---|
| Silicone oil (note 1) | 2.0 |
| Ethylene diamine tetraacetic acid (tetra sodium salt) | 5.0 of a 39% water solution |
| Sodium carbonate - anhydrous absorbent grade (Note 2) | 10 |
| Surfactant - Ethylene oxide adduct of mixed $C_{12}$ - $C_{14}$ alcohols (straight primary 60% ethylene oxide (Note 3) | 0.5 |
| Ammonium sulfate | 3 |
| Carboxy methyl cellulose | 0.5 |
| Anhydrous magnesium sulfate (Note 4) | 2 |
| Abrasives (mixture of 7.4 parts by weight quartz with 1 part of diatomaceous earth) | Balance |

Note 1 - The commercial product G. E. Silicone Oil SF 96, having a viscosity of 50 centipoises may be used.

Note 2 - A commercial product provided by Allied Chemical Co., anhydrous absorbent grade light soda ash, may be used.

Note 3 - The commercial surfactant Conoco Oil Co.'s Alfonic 1412-60 may be used.

Note 4 - This component may be omitted when the ethylene diamine tetraacetic acid is water-free.

A composition formulated in accordance with the above formula is tested by applying it to a virgin ceramic plate, which has been dirtied with a baked on gravy mix. The plate was also tested by pretreating it with the composition under consideration, and then cleaning it in the same way in which it was pretreated. In all instances, the baked-on gravy mix is provided by using an A & P mushroom gravy, with the mushrooms removed, the gravy being baked on the ceramic surface for ½ hour at 170° C. The following results are obtained:

TABLE

| | Untreated | Pretreated |
|---|---|---|
| Water | 400 | 400 |
| Delete Polishing Cleanser | 75 | 75 |
| Corning Cleaner Conditioner | 78 | 50 |
| Composition of this Invention | 68* | 33** |

In the above tabulation, the numbers signify the number of back and forth rub cycles which are required to remove the baked-on gravy mix. A Gardner Straight Line Washability and Abrasion Machine is used with a four pound weight added for these measurements. A single asterisk indicates superiority with respect to the other products noted which is sufficient to be discerned by an ordinary user. The double asterisk indicates a very significant improvement which would be evident to even a casual user.

The three percent of ammonium sulfate can be replaced by one percent of sodium bisulfate to provide a comparable buffering action, but at lower cost.

It is desired to note that the composition of this invention does not employ any chlorine bleach, and there is no excessive abrasive action. As a result, the ceramic surface is not unduly abraded or scratched, and the ceramic surface is more easily cleaned then heretofore, and the cleaning action is accompanied by a conditioning action as a result of the presence of the silicone oil, which makes subsequent cleaning even easier than it was on first application to the virgin plate.

The invention is defined in the claims that follow.

We claim:

1. An alkaline cleaning and conditioning composition for ceramic surfaces consisting essentially of an abrasive powder mixture including from 0.1% to about 0.5% of the weight of the composition of a surfactant, at least about 50% of the weight of the composition being abrasive powder, and from 1% to 5% of the weight of the composition being a silicone oil absorbed in a water soluble absorbent, said composition having an alkaline pH in 1% water solution not in excess of pH 11.0.

2. A cleaning and conditioning composition as recited in claim 1 in which the abrasive powder component of the mixture is a mixture of an abrasive powder selected from alpha quartz, pumice and feldspar, and diatomaceous earth in an amount of 1 part of diatomaceous earth per from 2 to 10 parts of said abrasive powder.

3. A cleaning and conditioning composition as recited in claim 1 in which said surfactant is nonionic.

4. A cleaning and conditioning composition as recited in claim 1 in which said surfactant is an ethylene oxide adduct of a $C_{12}$–$C_{14}$ straight chain primary alcohol containing from 50–75% ethylene oxide, and is used in an amount of from about 0.1–1.0% by weight.

5. A cleaning and conditioning composition as recited in claim 1 in which said silicone oil is a methylsubstituted polysiloxane having a viscosity of from about 5 to about 500 centipoises.

6. A cleaning and conditioning composition as recited in claim 1 in which the water soluble absorbent is alkali metal carbonate.

7. A cleaning and conditioning composition as recited in claim 6 in which the alkali metal carbonate is synthetically produced sodium carbonate of high absorbency.

8. A cleaning and conditioning composition as recited in claim 1 in which the powder mixture is buffered with sodium bisulfate.

9. A cleaning and conditioning composition as recited in claim 1 in which the powder mixture includes a chelating agent for metals to remove metal marks and hard water deposits.

10. A cleaning and conditioning composition as recited in claim 9 in which the chelating agent is a polycarboxylic acid salt.

11. A cleaning and conditioning composition as recited in claim 10 in which the chelating agent is the tetrasodium salt of ethylene diamine tetraacetic acid.

12. A cleaning and conditioning composition as recited in claim 11 including a water soluble film former to reduce the tendency of the abrasive powder to scratch.

13. A cleaning and conditioning composition as recited in claim 12 in which the water soluble film former is cellulosic.

14. A cleaning and conditioning composition as recited in claim 12 in which the water soluble film former is carboxy methyl cellulose.

15. A cleaning and conditioning composition as recited in claim 12 in which the powder abrasive has an average particle diameter in the range of 140 to 180 mesh measured on standard Taylor screens.

16. An alkaline cleaning and conditioning composition for ceramic surfaces comprising an abrasive powder mixture including from 70–90% of abrasive particles, from 0.1–1.0% of a nonionic surfactant, from 1–5% of a silicone oil which is a methyl-substituted polysiloxane having a viscosity of from 5–500 centipoises absorbed on sodium carbonate powder, said sodium carbonate being used in an amount of at least 2 parts thereof per part of silicone oil and providing said powder mixture, in 1% water solution, with an alkaline pH not in excess of 10.0.

17. A cleaning and conditioning composition as recited in claim 16 in which the abrasive particles comprise a mixture of alpha quartz having a moh hardness not in excess of 7.5 and diatomaceous earth, the scratching tendency of said abrasive powder mixture being minimized by the presence of from 0.1–3% of a water soluble cellulosic film former.

18. An alkaline abrasive powder mixture comprising abrasive particles, a surfactant, a water soluble absorbent alkaline powder, and from 1–5% of a silicone oil absorbed on said water soluble alkaline powder, said composition having an alkaline pH in 1% water solution not in excess of pH 11.0.

* * * * *